3,239,575
HYDROCARBON CONVERSION WITH LOW CROSS-LINKED SULFONATED RESINS
Vincent J. Frilette, Erlton, and Werner O. Haag, Lawrence Township, Mercer County, N.J., assignors to Socony Mobil Oil Company, Inc., a corporation of New York
No Drawing. Filed Mar. 2, 1965, Ser. No. 436,651
4 Claims. (Cl. 260—671)

This application is a continuation-in-part of copending application Serial No. 143,596, filed October 9, 1961, now abandoned.

This invention relates to hydrocarbon conversion. It is more particularly concerned with reactions of hydrocarbons that are carried out in anhydrous systems and in the presence of specified resin catalysts.

As is well known to those familiar with the art, sulfonated aromatic resins, such as sulfonated polystyrene resins, have been proposed as catalysts for various reactions. These catalysts have been known as ion-exchange resins, used in water treatment. The various reactions for which the ion-exchange resin catalysts have been proposed include, dehydration of alcohols; synthesis of alcohols and ethers from olefins and water; alkylation of phenols with olefins; alkylation of aromatic hydrocarbons with alcohols; ester formation and ester hydrolysis; and the like. It will be noted that the reactions in which such resins have been successfully used all involve a polar medium, i.e., at least one reactant has been a polar, oxygen-containing compound, such as an alcohol, water, phenol, etc.

In the case of anhydrous hydrocarbon reaction systems, the sulfonated resins, such as conventional sulfonated polystyrene resin, have been relatively inactive. Thus, for example, in the alkylation of benzene with propylene, virtually no cumene was produced. Such conventional sulfonated resins are crosslinked resins, such as copolymers of styrene and divinylbenzene (cross-linking agent), containing greater than 4% up to 24% or more of cross-linking agent. Usually conventional resins contain at least 8% cross-linking agent. As is well known to those skilled in the art, the conventional catalysts used in many anhydrous non-polar reaction systems have been strong acids, Friedel-Crafts catalysts, etc., which have been disadvantageous from the standpoints of catalyst separation and corrosion of the reaction vessel. Further, in many non-polar reactions involving hydrocarbons, relatively large amounts of catalyst are required to convert a given amount of reactants. It will be appreciated, therefore, that it is highly desirable to have a catalyst for anhydrous reaction systems that can be readily separated from products and unconverted reactants, and which is not corrosive. It is further desirable to have a catalyst which will convert relatively large amounts of reactant with a relatively small amount of catalyst.

It has now been found that catalytic hydrocarbon conversion reactions can be carried out readily and economically, with little corrosion difficulty and with ease of separation of catalyst from the reaction product. It has been discovered that anhydrous hydrocarbon conversion reactions, particularly those involving olefinic hydrocarbons, can be carried out in the presence of a class of sulfonated organic resin copolymers having a low amount of cross-linking, less than 4 weight percent.

Accordingly, it is a broad object of this invention to provide a process for hydrocarbon conversion. Another object is to provide a catalytic process for anhydrous hydrocarbon conversion reactions, particularly those involving olefins. A specific object is to provide catalytic hydrocarbon conversion processes carried out in the presence of specific sulfonated organic resins. A more specific object is to provide catalytic hydrocarbon conversion processes involving olefins that are carried out in the presence of a class of sulfonated organic resin copolymers having specific low cross-linkage. Another object of this invention is to provide a process for the manufacture of alkylaromatic hydrocarbons. A more specific object is to provide a novel catalytic process for the manufacture of paradiisopropylbenzene by reaction of benzene and propylene. Another object of this invention is to provide a process for the polymerization of olefinic hydrocarbons. A more specific object is to provide a novel catalytic process for the manufacture of polymers of isobutylene. Other objects and advantages of this invention will become apparent to those skilled in the art, from the following detailed description.

In general, the present invention provides a process for carrying out anhydrous catalytic hydrocarbon conversion reactions involving olefins, that comprises carrying out said reactions, under conversion conditions, in the presence of a sulfonated synthetic resin copolymer in its acid form having less than 4 percent cross-linking and which sorbs more than about 22 moles of water per equivalent sulfonic acid.

The catalysts utilizable in the process of this invention are sulfonated synthetic resin copolymers of a vinylaromatic compound and a divinyl cross-linking agent, having less than 4 weight percent cross-linking Examples of vinylaromatic compounds are styrene, chlorostyrene, α-methylstyrene, vinylnaphthalene, acenaphthylene, and vinylthiophene. Typical cross-linking agents include, for example, divinylbenzene, diallyl carbonate, diallyl phthalate, and diallyl maleate. Techniques for preparing copolymer resins and for sulfonating them are well known in the art and are described, for example, in U.S. Patent 2,366,007.

In order to have a high degree of activity for hydrocarbon conversion, it is essential that the resin contain a low amount of cross-linking. In the case of conventional sulfonated styrene-divinylbenzene resins, the extent of cross-linking is measured in terms of the weight percent of divinylbenzene in the unsulfonated copolymer. Thus, the conventional resins are said to have "8% crosslinkage," i.e., they are prepared from a styrene-divinylbenzene copolymer composed of 8% divinylbenzene and 92% styrene and other monovinyl monomers.

In general, the extent of cross-linking can be measured in terms of the amount of water sorbed by the resin, when the dry sulfonated resin in its hydrogen form is exposed at room temperature to an atmosphere of 100 percent relative humidity. The amount of water sorbed is expressed in moles of water per equivalent of sulfonic acid groups. Resins with a low degree of crosslinkage sorb more water than those with a high degree of crosslinkage. For example, a sulfonated resin prepared from a styrene-divinylbenzene copolymer containing 4 percent divinylbenzene sorbs about 22 moles of water per equivalent sulfonic acid, while a similar resin prepared from a copolymer containing 8 percent divinylbenzene sorbs only about 12 moles of water per equivalent sulfonic acid.

The extent of cross-linking in the sulfonated styrene-divinylbenzene resin should be less than 4 percent, for the activity for hydrocarbon conversion to be enhanced. The greater activity is effected with less than about 2 percent cross-linking down to about 0.5 percent. This will be apparent from the following examples.

*Examples 1 through 5*

Runs were carried out to alkylate benzene with propylene as follows: Into an autoclave were charged 78.0 g. benzene, 8.6 g. propylene, and 2 g. catalyst. The autoclave was operated at 130° C. and the rate of alkylation was measured in terms of millimoles cumene produced per gram catalyst per hour. The initial pressure was found to be 140 p.s.i.g., with some decrease, as the reaction proceeded, to about 80 p.s.i.g. The catalysts used were acid form sulfonated styrene-divinylbenzene ion exchange resins, having particle size of 50–100 mesh spheres. The amount of divinylbenzene was different in each case. Pertinent data are set forth in the table.

TABLE.—CATALYST

| Example | Percent Divinyl-benzene | m. moles cumene/g. catalyst/hr. |
|---|---|---|
| 1 | 8 | 7.1 |
| 2 | 4 | 8.9 |
| 3 | 2 | 29 |
| 4 | 1 | 61 |
| 5 | 0.5 | 60 |

Various useful products can be made with the use of low cross-linked resin catalysts. For example, benzene can be reacted with propylene to form isopropylbenzene or polyisopropylbenzenes simply by suspending the catalyst in benzene and bubbling propylene therethrough at about 75° C. and 1 atmosphere total pressure. Other olefins such as butylene, heptene, propylene tetramer or higher molecular weight olefins can be reacted with benzene, toluene, or a polynuclear aromatic such as naphthalene to form a variety of alkylbenzenes. Ethylene can be reacted with benzene to form ethylbenzene, which is useful for the preparation of styrene monomer. Trans-alkylations can be catalyzed by the process of this invention; for example, polyalkylated benzenes may be reacted with benzene to form monoalkylbenzenes.

In addition to the reactions described above, other types of reactions may be carried out advantageously with the use of low cross-linked resin catalysts. Alphapinene can be isomerized to form camphene. Other valuable isomerization reactions of olefinic hydrocarbons also may be carried out.

The utility of the process of this invention is clearly associated with the discovery that low cross-linked sulfonated resins are capable of catalyzing the transformation of reactants to products in non-aqeous media in cases for which neither reactants nor products contain polar groups that are capable of markedly swelling the resin catalyst. It should be noted, however, that in selected instances the process of this invention may be practiced advantageously even though some swelling activity may be exhibited by the reagent or product.

GENERAL PROCESS CONDITIONS

The reaction conditions can vary widely for the various reactions indicated above. To a large extent the exact conditions depend on the activity of the olefin undergoing reaction. Tertiary olefins react most readily, followed by secondary olefins. With both these olefin types, mild conditions are required. For example, with propylene, which reacts fairly readily with benzene to form cumene, the reaction can be carried out in liquid phase by simply bubbling propylene through the reaction mixture at somewhat elevated temperature, say 60 to 70° C. Elevated pressure is advantageous. Ethylene, a primary olefin, which reacts with much more difficulty, can be induced to react readily at temperatures and pressures in the neighborhood of 10–100 atmospheres and 100–200° C. In general, it is not desirable to exceed in the reaction zone, temperatures of about 180 to 200° C. Temperatures in excess of this tend to render the catalyst unstable.

For reactions in which a liquid phase is present, the process can include various and diverse means for removing the exothermic heat of reaction. For example, in the preparation of cumene, the heat of reaction can be removed simply by allowing vaporous benzene to condense on a heat-transfer surface external to the reaction zone. As one alternative, internal cooling coils can be incorporated in the reaction zone to control the temperature.

In general, it is desirable to exclude from the reaction zone any substantial amounts of water; failure to do so renders the catalyst temporarily less effective. Also, it should be noted that freshly prepared and dried catalysts may not appear to be active for several hours, after which time marked activity and conversion appear.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for alkylating an aromatic hydrocarbon, which comprises contacting an aromatic hydrocarbon and an olefin with an acid-form sulfonated synthetic resin copolymer catalyst having less than 4 weight percent cross-linking and which sorbs more than 22 moles of water per equivalent sulfonic acid.

2. The process defined in claim 1 wherein said olefin is propylene.

3. A process for alkylating an aromatic hydrocarbon, which comprises contacting benzene and an olefin with an acid-form sulfonated synthetic resin copolymer catalyst having less than 4 weight percent cross-linking and which sorbs more than 22 moles of water per equivalent sulfonic acid.

4. A process for alkylating benzene that comprises contacting benzene and an olefin with an acid-form sulfonated polystyrene resin catalyst cross-linked with less than 4 percent divinylbenzene, which sorbs more than about 22 moles of water per equivalent sulfonic acid.

References Cited by the Examiner

UNITED STATES PATENTS 3,017,441   1/1962   Thomas et al. _____ 260—671
3,037,052   5/1962   Bortnick _____ 260—671 X PAUL M. COUGHLAN, Primary Examiner.

DELBERT E. GANTZ, Examiner.